(12) United States Patent
Badura

(10) Patent No.: US 6,897,644 B1
(45) Date of Patent: May 24, 2005

(54) APPARATUS AND METHOD FOR MONITORING A SIGNAL

(75) Inventor: Eugen Badura, Darmstadt (DE)

(73) Assignee: GSI Gesellschaft fuer Schwerionenforschung mbH, Darmstadt (DE)

(*) Notice: Subject to any disclaimer, the term of this patent is extended or adjusted under 35 U.S.C. 154(b) by 0 days.

(21) Appl. No.: 09/554,174

(22) PCT Filed: Sep. 10, 1999

(86) PCT No.: PCT/EP98/06715
§ 371 (c)(1),
(2), (4) Date: Jul. 14, 2000

(87) PCT Pub. No.: WO00/16176
PCT Pub. Date: May 23, 2000

(30) Foreign Application Priority Data

Sep. 11, 1998 (DE) .................. 198 41 543

(51) Int. Cl.[7] .................................. G01R 11/63
(52) U.S. Cl. ...................... 324/103 P; 324/158.1
(58) Field of Search .............. 324/103 P, 76.12, 324/76.19, 602, 326, 671, 657, 617, 76.13; 361/83, 86; 327/58, 59

(56) References Cited

U.S. PATENT DOCUMENTS

| | | | | |
|---|---|---|---|---|
| 3,710,249 A | * | 1/1973 | Kadar ...................... | 324/103 P |
| 3,753,109 A | * | 8/1973 | Schainbaum ................ | 324/103 |
| 3,800,236 A | * | 3/1974 | Riethmuller et al. ........ | 328/162 |
| 3,965,419 A | * | 6/1976 | Paiva ...................... | 324/103 P |
| 4,106,071 A | * | 8/1978 | Sun et al. ................ | 361/83 |
| 4,166,245 A | * | 8/1979 | Roberts ................... | 324/103 P |
| 4,295,099 A | * | 10/1981 | Evans ...................... | 328/151 |
| 4,311,960 A | * | 1/1982 | Barr ....................... | 324/103 |
| 4,470,091 A | * | 9/1984 | Sun et al. ................ | 361/86 |
| 4,968,946 A | * | 11/1990 | Maier ...................... | 324/671 |
| 5,055,766 A | * | 10/1991 | McDermott et al. ......... | 323/255 |
| 5,214,319 A | * | 5/1993 | Abdi ....................... | 307/351 |
| 5,889,406 A | * | 3/1999 | Yamamoto et al. .......... | 324/657 |

* cited by examiner

Primary Examiner—Vinh P. Nguyen
(74) Attorney, Agent, or Firm—Frommer Lawrence & Haug LLP; Ronald R. Santucci

(57) ABSTRACT

An apparatus and a method for monitoring a signal are proposed. The apparatus comprises: a first detector (10) to which the signal is supplied and which, when the signal exceeds the predetermined first threshold value, emits a trigger signal, a second detector (20) to which the signal is also supplied and which, when the signal exceeds the predetermined second threshold value, emits an exceed signal, a signal generator (30) to which the output of the first detector (10) is supplied and which starts to emit a window signal of a predetermined duration as soon as the trigger signal appears at its input side, an AND gate (40) to which the output of the first detector (10) and the output of the signal generator (30) are supplied at its input side and which generates a peak-detection signal when the window signal and the exceed signal are present at its input side. In the method, the following steps are performed cyclically: determining the amplitude of the signal; emitting a peak-detection signal if the amplitude of the signal exceeds a predetermined value within a predetermined time.

8 Claims, 9 Drawing Sheets

(a)

(b)

APPARATUS AND METHOD FOR MONITORING A SIGNAL

CROSS REFERENCE TO RELATED APPLICATIONS

Figure 1:
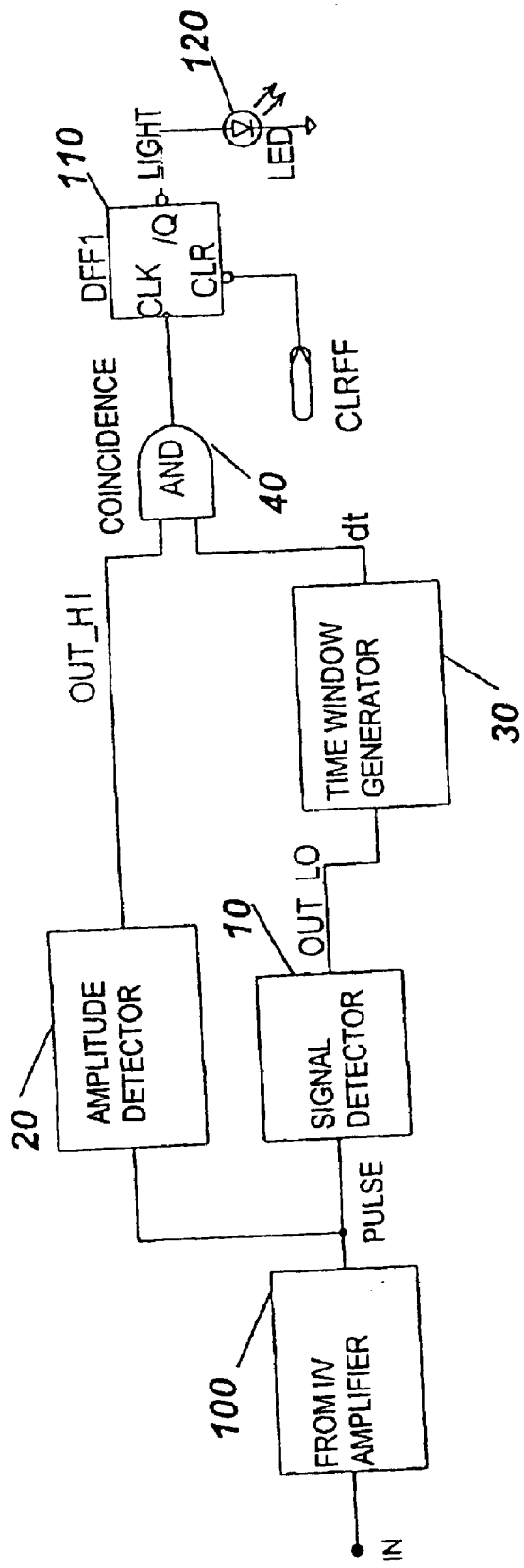

This application is a 35 U.S.C. §371 application of PCT/EP99/06715, filed on Sep. 10, 1999, and claims the benefit of priority of German Application No 198 41 543.5, filed on Sep. 11, 1998

The present invention relates to an apparatus and a method for monitoring a signal for the detection of peak values.

Such an apparatus and such a method are used in measuring techniques where it is necessary to monitor signals that exhibit sudden, grossly excessive peak values. In conventional measurement of the magnitude of a signal, the occurrence of such peak values can lead to overloading of the measuring system and to disruption of the measurement.

This will be explained with reference to the example of the electronic monitoring of the intensity of particle beams produced in a synchrotron. When a particle beam is produced by extraction from a synchrotron, it is possible in rare instances that the entire instantaneous contents of the synchrotron—that is to say the total number of particles present in the synchrotron—will exit within a few milliseconds. In that case, particle intensities a thousand times higher than expected can occur. That situation is called fast extraction, in contrast to normal extraction in which the particles exit over a period of several seconds.

Fast extraction can result in damage to the apparatuses or materials acted upon by the particle beam if the particle beam is not interrupted sufficiently quickly. This is particularly important in the case of irradiation of humans in the course of tumour treatment with particle beams.

Although known apparatuses and methods for measuring and monitoring beam intensity for normal extraction on the basis of an electrical signal are also capable of detecting a fast extraction and of initiating an interruption procedure, because of their main function—that of measuring beam intensity as accurately as possible—they do not react sufficiently rapidly. In addition, the known apparatuses for intensity measurement provide no results when the measuring range is clearly exceeded during the measurement.

The objective of the invention, therefore, is to provide an apparatus and a method for monitoring a signal which make possible a rapid and reliable detection of the occurrence of peak values. That objective is achieved by an apparatus according to claim 1 or 2 and by a method having the features according to claim 6, 7 or 8. Advantageous developments are defined in the subsidiary claims.

In accordance with the invention, the apparatus for monitoring a signal comprises: a first detector to which the signal is supplied at its input side and which, when the signal exceeds the predetermined first threshold value, emits a trigger signal at its output side, a second detector to which the signal is also supplied at its input side and which, when the signal exceeds the predetermined second threshold value, emits an exceed signal at its output side, a signal generator to which the output of the first detector is supplied at its input side and which starts to emit a window signal of a predetermined duration as soon as the trigger signal appears at its input side, an AND gate to which the output of the first detector and the output of the signal generator are supplied at its input side and which generates a peak-detection signal at its output side when the window signal and the exceed signal are present at its input side.

In a further embodiment, the apparatus according to the invention for monitoring a signal comprises: a first detector to which the signal is supplied at its input side and which, when the signal exceeds the predetermined first threshold value, emits a first exceed signal at its output side, a second detector to which the signal is also supplied at its input side and which, when the signal exceeds the predetermined second threshold value, emits a second exceed signal at its output side, a differentiator to which the signal is also supplied at its input side and which emits the time derivative of the signal at its output side, a third detector to which the time-derived signal is supplied at its input side and which, when the time-derived signal exceeds a predetermined third threshold value, emits a rise signal at its output, side, a first AND gate to which the output of the first detector and the output of the third detector are supplied at its input side and which emits a trigger signal at its output side when the first exceed signal and the rise signal are present at its input side, a signal generator to which the output of the AND gate is supplied at its input side and which begins to emit a window signal of a predetermined duration at its output side as soon as the trigger signal is present at its input side, a second AND gate to which the output of the second detector and the output of the signal generator are supplied at its input side and which generates a peak-detection signal at its output side when the second exceed signal and the window signal are present at its input side.

In the case of the method according to the invention, for monitoring a signal the following steps are performed cyclically: determining the amplitude of the signal; emitting a peak-detection signal if the amplitude of the signal exceeds a predetermined value within a predetermined time.

In a further embodiment of the method according to the invention for monitoring a signal, the following steps are performed cyclically: ascertaining whether the signal exceeds a predetermined first threshold value and, if the signal exceeds the predetermined first threshold value, starting to generate a window signal of a predetermined duration, ascertaining whether the signal exceeds a predetermined second threshold value and, if the signal exceeds the predetermined second threshold value, generating an exceed signal, emitting a peak-detection signal if both the window signal and the exceed signal are present. The I/V amplifier is a component part of the therapy arrangement and serves as a current/voltage transformer.

The apparatus according to the invention and the method according to the invention are associated with a number of advantages. Since the apparatus and the method are based on measuring systems that are already used for intensity monitoring of normal extraction, no additional signal-extraction means are required. The signals extracted for normal intensity measurement are evaluated. Any additional influencing of the beam and of the normal intensity measurement is also thereby avoided. The normal intensity measurement and the monitoring according to the invention can therefore be carried out in parallel with each other. Owing to the principle of detecting the change in the signal, the apparatus and the method according to the invention are especially fast and can therefore operate in real time.

In the embodiment of the invention according to claim 2 and claim 8, detection of the direction of the edges of the signal being monitored is provided. That measure is advantageous for an application in which peak values in the signal to be monitored may also appear in succession within a short time, for example in such a manner that a first, possibly uncritical, peak value has not yet subsided completely and the signal is already rising in the direction a successive, this time critical, peak value. A new rise measurement can then take place even though the signal has not fallen below the first (lower) threshold.

Figure 2:
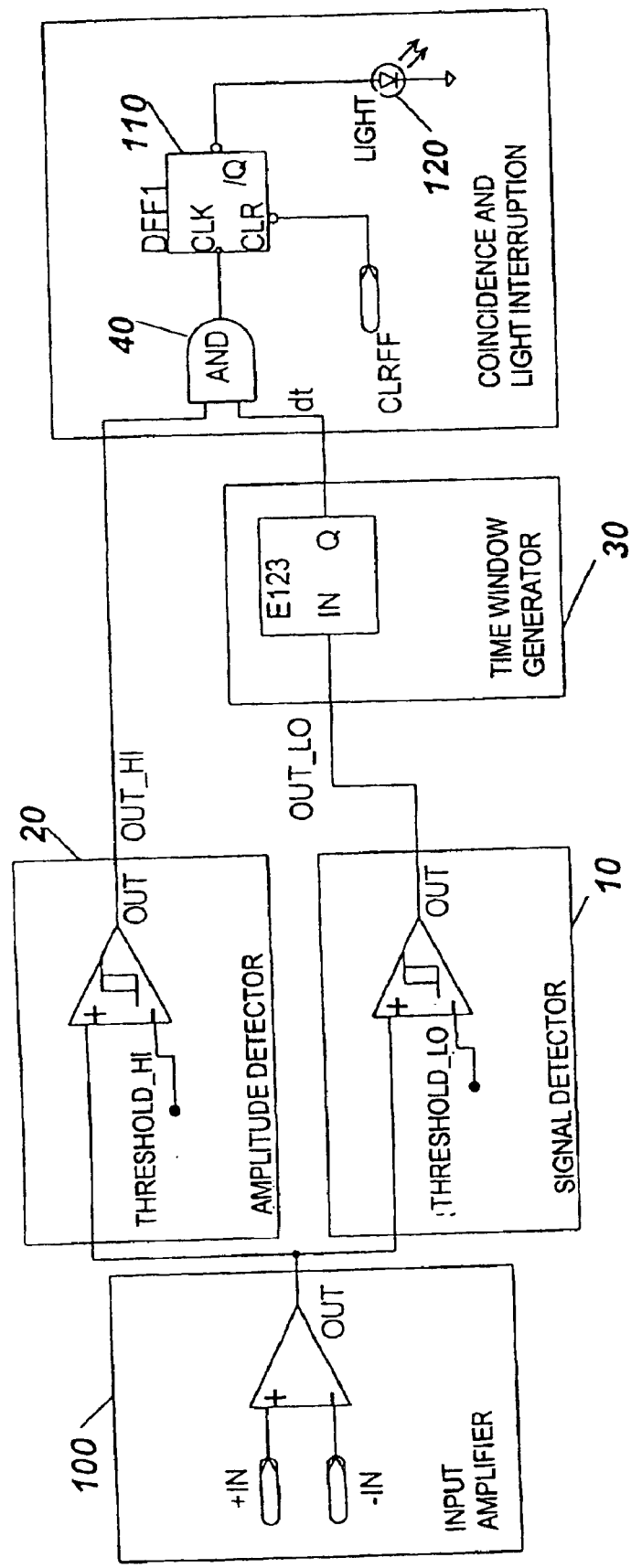
Figure 3:
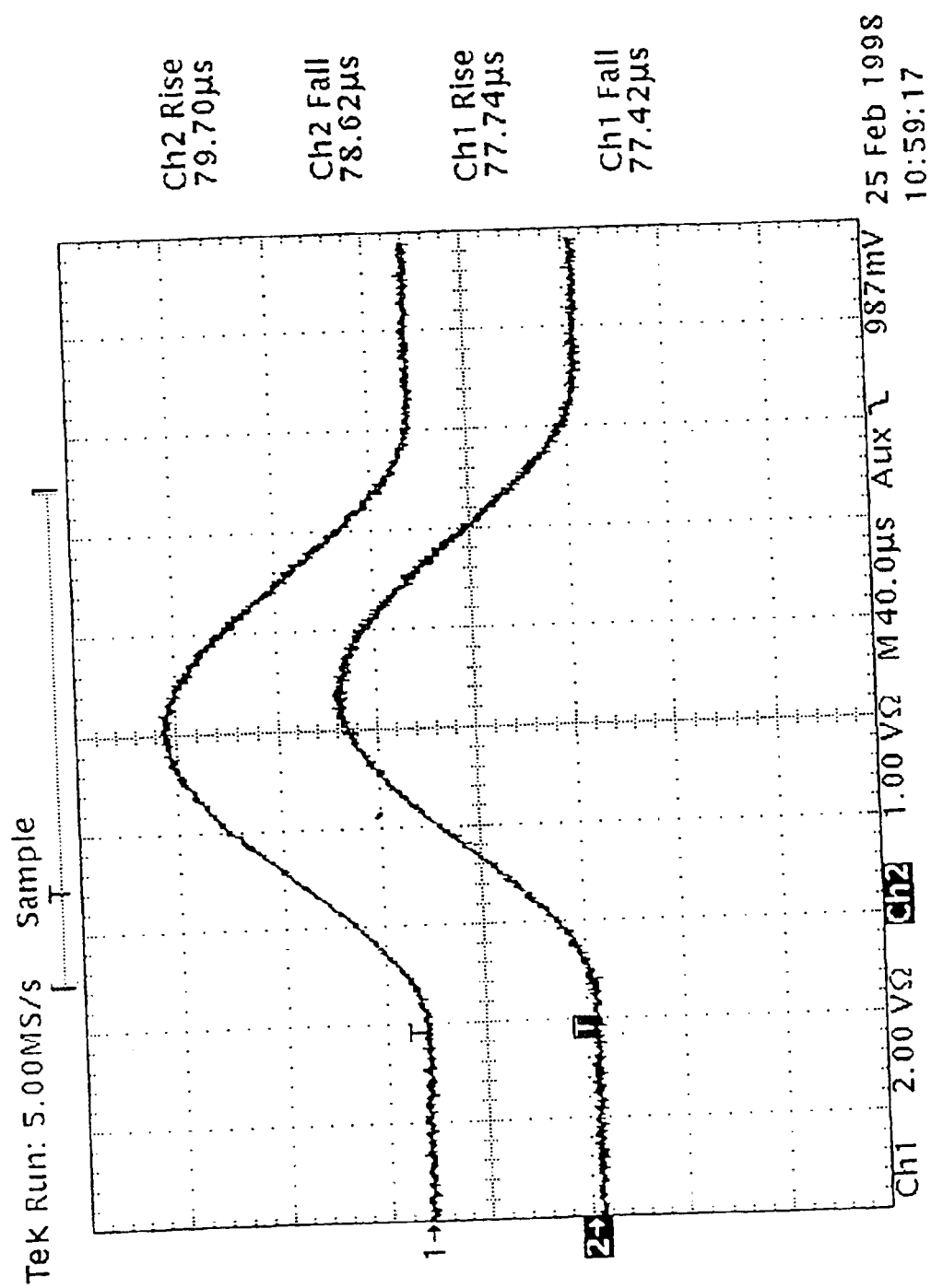
Figure 3:
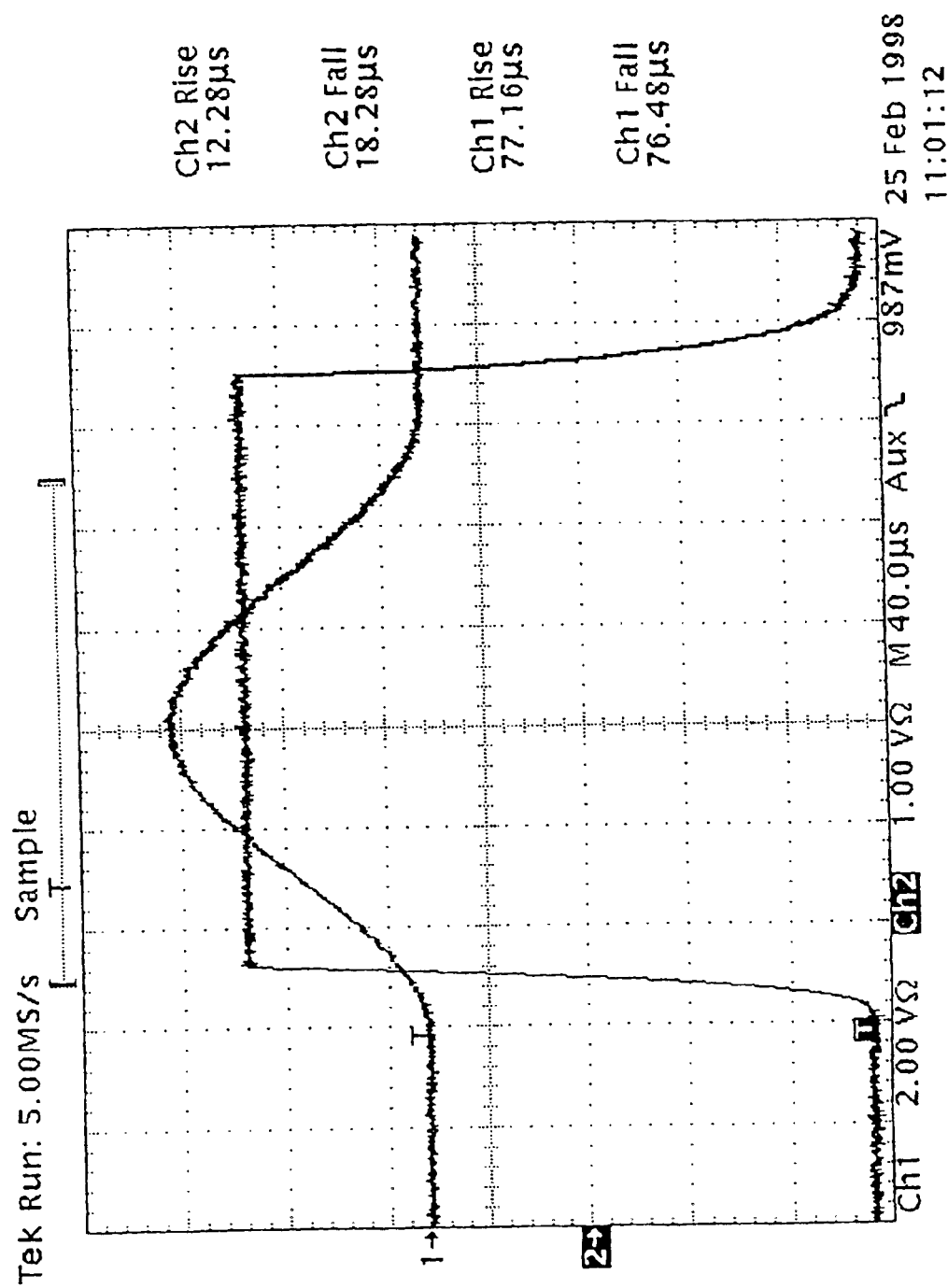
Figure 4:
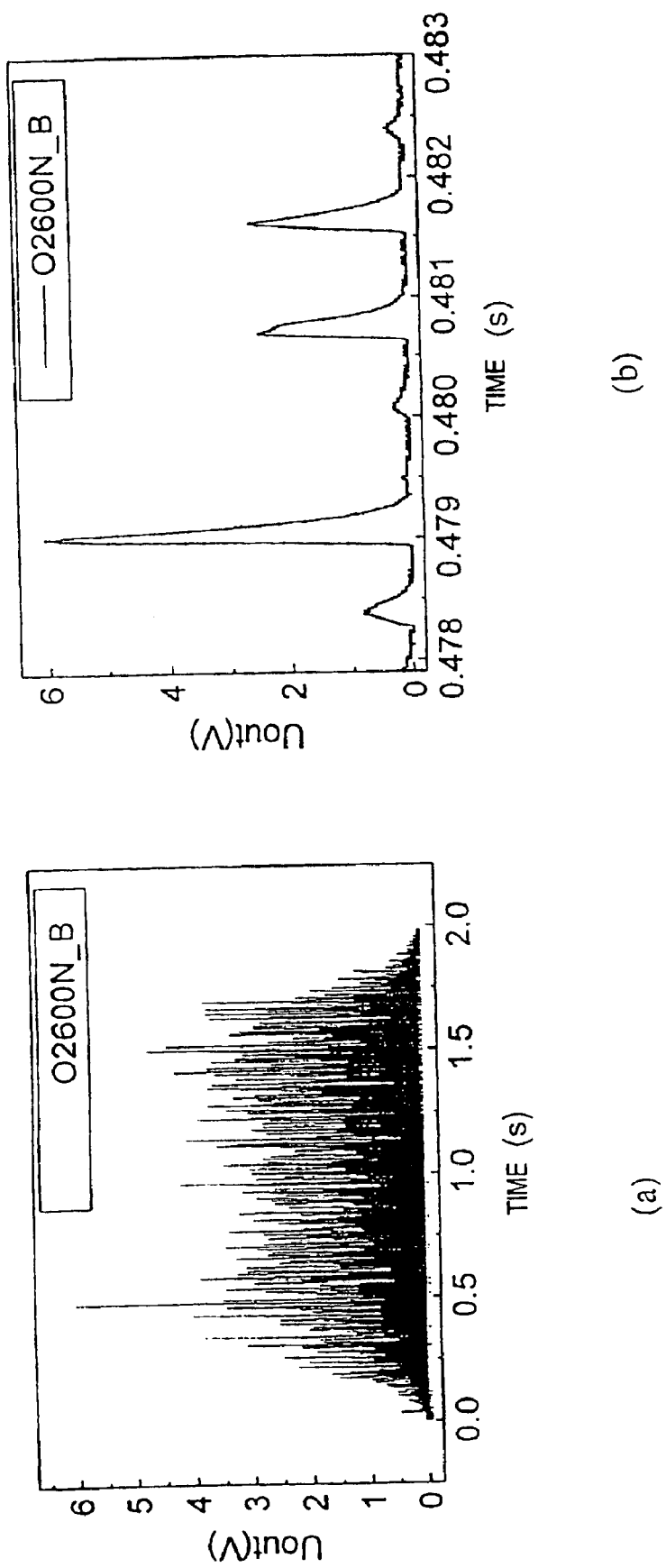
Figure 5:
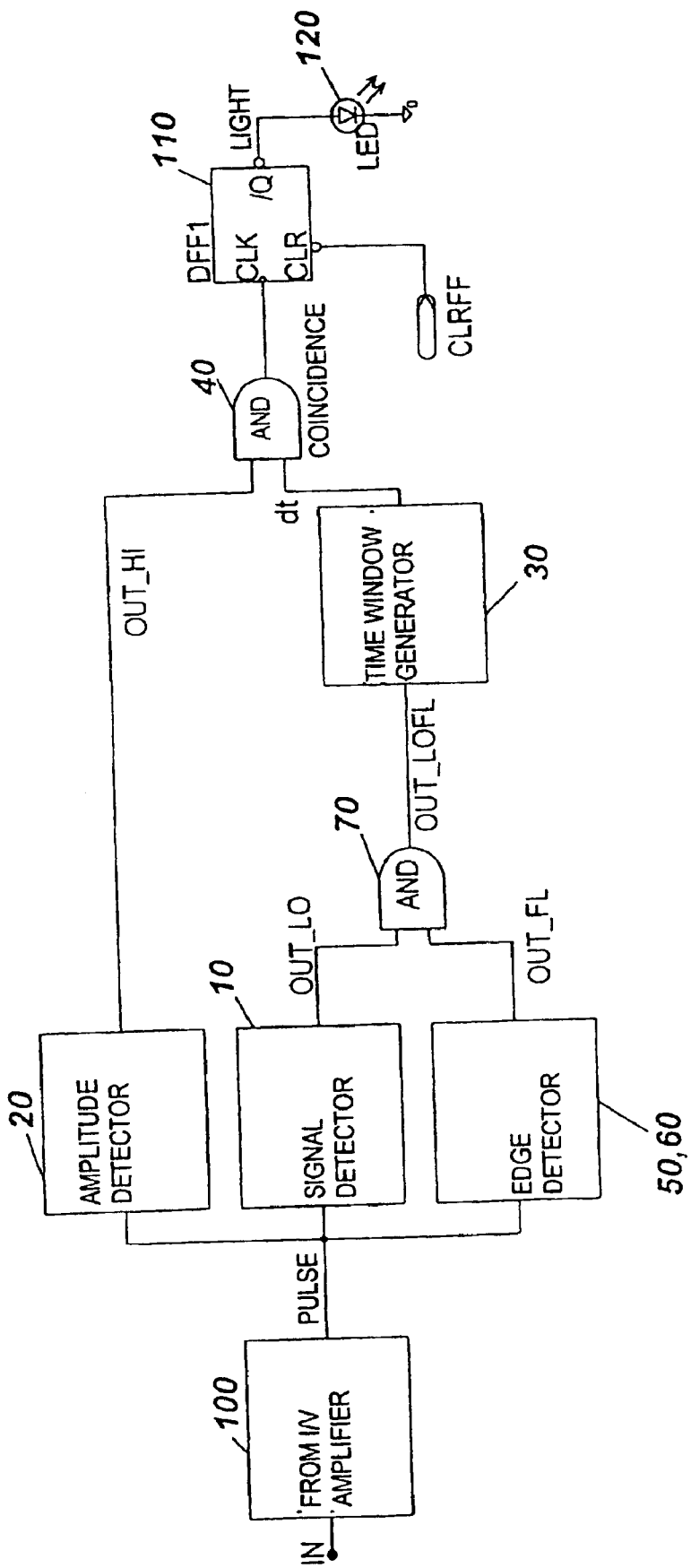
Figure 6:
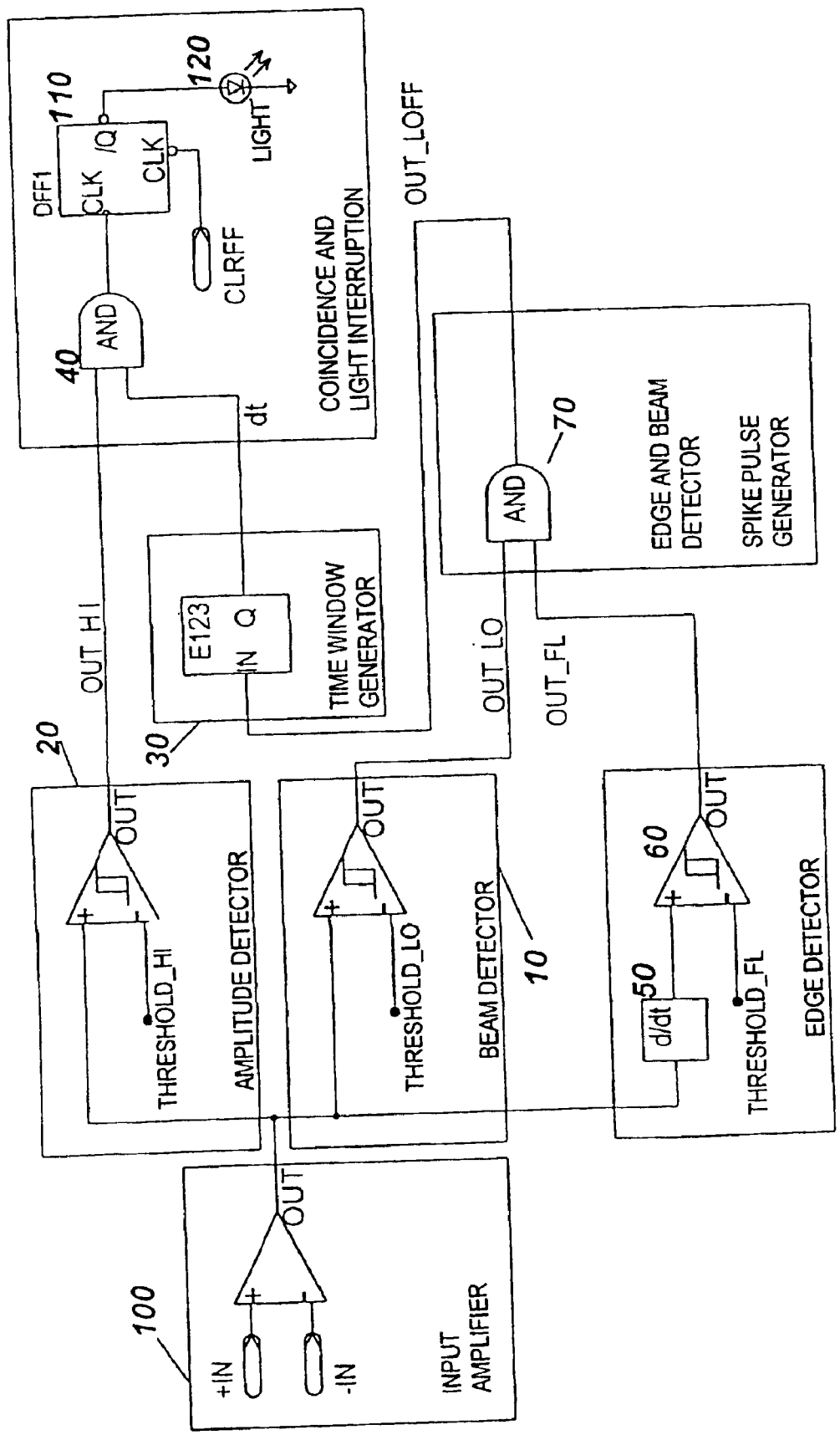
Figure 7:
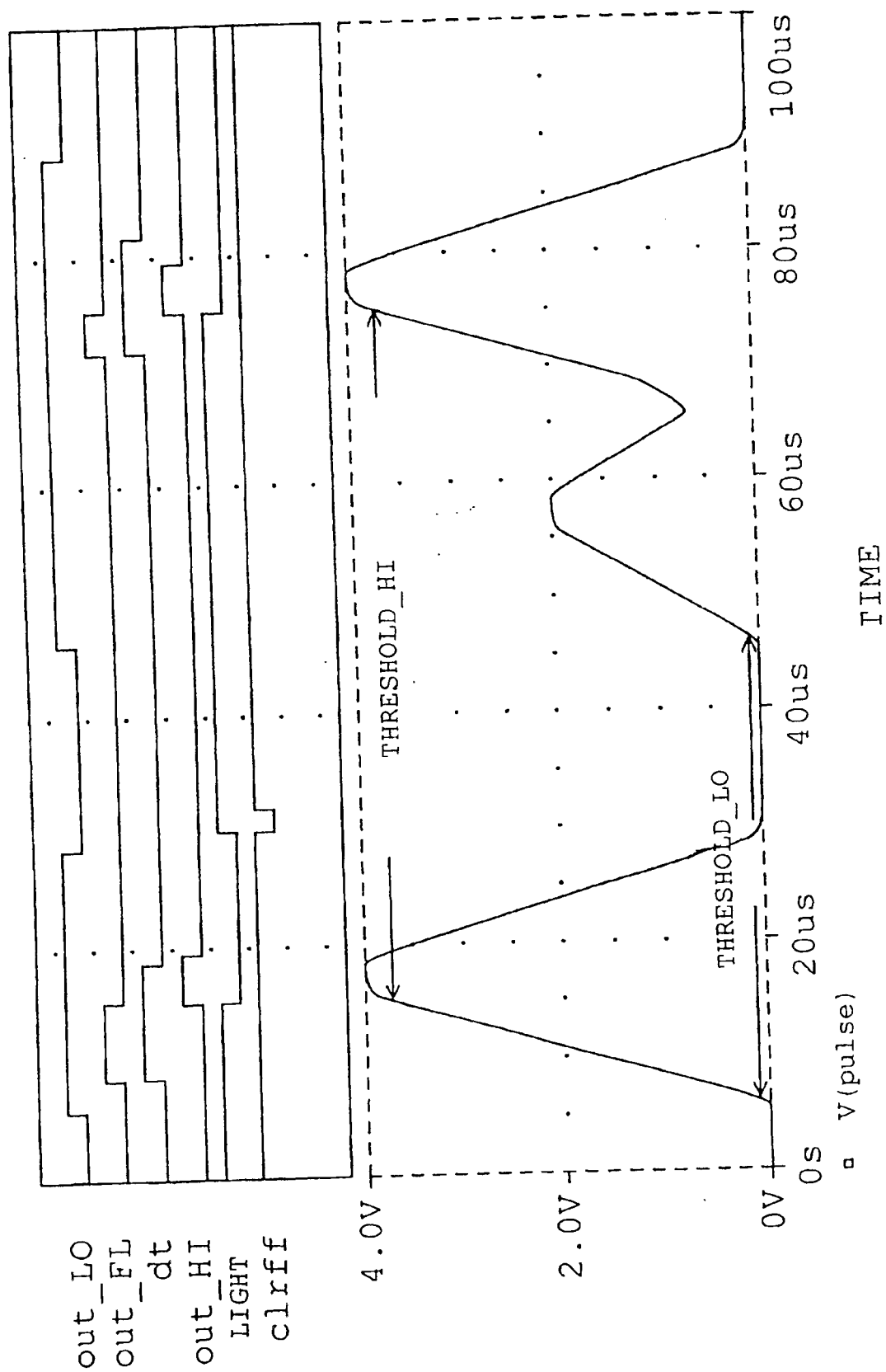
Figure 8:
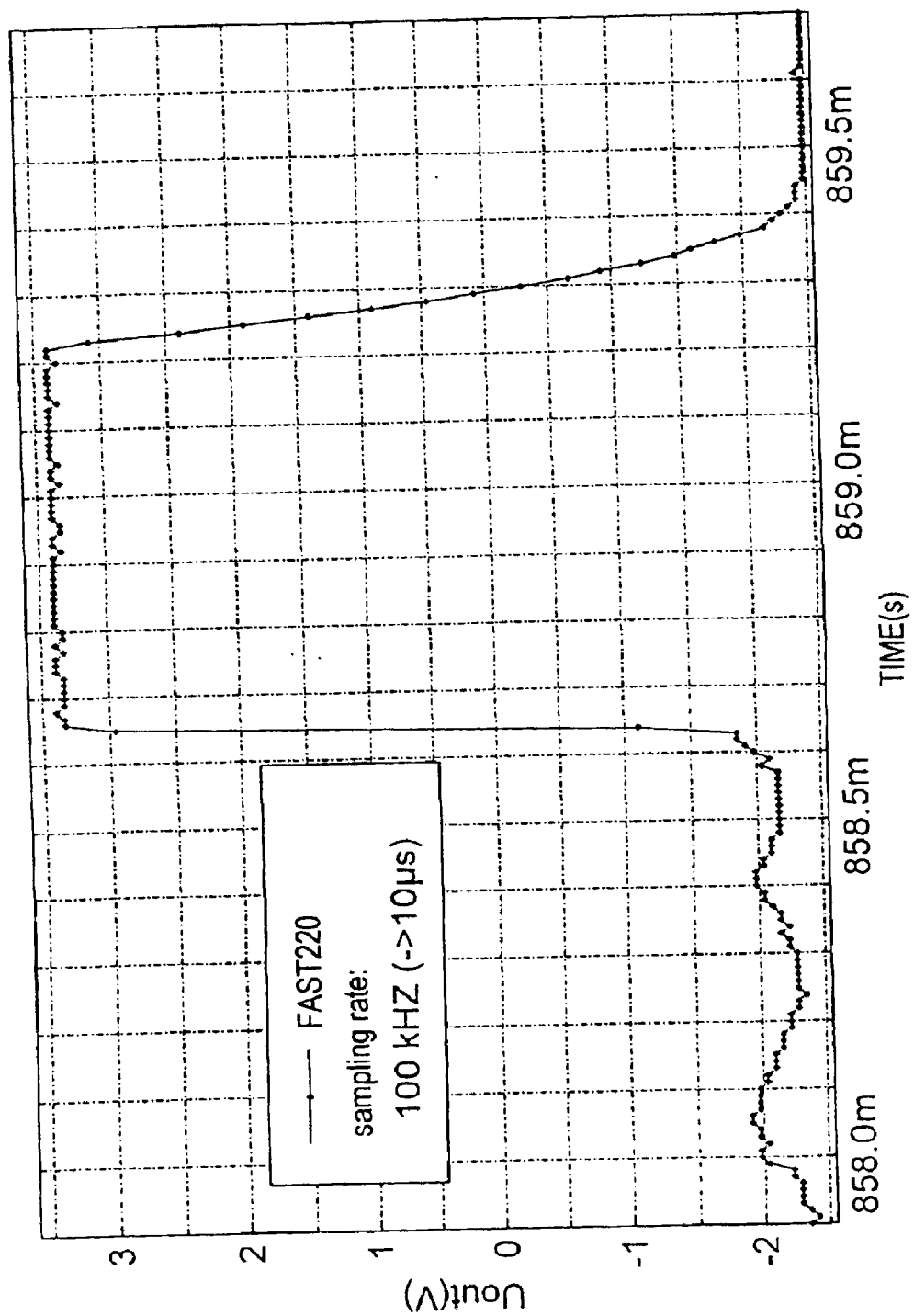

The invention is described in detail with reference to illustrative embodiments and the drawings, in which:

FIG. 1 is a block diagram of an apparatus for monitoring a signal according to the first illustrative embodiment of the invention, FIG. 2 is a block circuit diagram of the apparatus of FIG. 1, FIG. 3 shows signal curves at an amplifier, FIG. 4 shows in diagram (a) the typical variation of a signal to be monitored and a portion thereof in diagram (b), FIG. 5 is a block diagram of an apparatus for monitoring a signal according to the second illustrative embodiment of the invention, FIG. 6 is a block circuit diagram of the apparatus of FIG. 5, FIG. 7 shows signal variations at specific components of the apparatus shown in FIG. 5, and FIG. 8 shows a real-time signal curve.

FIG. 1 is a block diagram of an apparatus for monitoring a signal according to the first illustrative embodiment of the invention, and FIG. 2 is a block circuit diagram thereof. The apparatus is used to monitor the beam intensity in a heavy-ion irradiation device for tumour treatment.

The signal that is to be evaluated for monitoring the beam intensity represents an intensity curve of the particle beam over time. That signal is supplied by an ionisation chamber which is arranged in the beam path of the particle beam. The particles passing through that chamber generate electrical charges the magnitude of which is a measure of the number of particles, or rather the intensity.

FIG. 3(a) shows a typical curve of that signal over an abscissa divided into seconds; FIG. 3(b) shows a portion of the signal in the time range around the peak value in a higher time resolution.

The charge signal to be monitored which is supplied by the ionisation chamber is passed to a current/voltage amplifier 100 at the input of the monitoring apparatus. The current/voltage amplifier 100 serves to separate the monitoring apparatus at the input side from an apparatus (not shown here) for beam intensity measurement to which the same signal is supplied. After the amplifier 100, the signal is passed into two branches. Arranged in one branch is a signal detector 10 which compares the magnitude of the signal supplied from the input with a low threshold value. That signal detector has the function of determining whether an intensity signal that is not equal to zero is being supplied, that is to say whether there is a particle beam at all. The signal detector 10 is constructed as a comparator which emits a high-level signal (lgoic "1") at its output if the input signal is greater than or equal to the threshold value threshold_LO, but, if it is not, emits no signal (logic "0"). The output of the signal detector 10 is connected to the input of a signal generator 30. The signal generator 30 generates a high-level output signal of a predetermined duration —opens a time window, therefore—as soon as a high-level signal is present at its input; the signal generator 30 is accordingly triggered by the signal detector 10.

Arranged in the other branch is an amplitude detector 20 which compares the magnitude of the signal supplied from the input with a high threshold value threshold_HI. The amplitude detector 20 also is constructed as a comparator that emits a high-level signal if the input signal is greater than or equal to the threshold value threshold_HI. The threshold value threshold_HI is so selected that it is only slightly below the maximum output voltage (the operating limit) of the input amplifier 100. The output of the signal generator 30 and the output of the amplitude detector 20 are supplied to the AND gate 40, which emits a high-level signal when both inputs are high. That signal drives a reaction device 110 which triggers a countermeasure, for example the immediate interruption of the particle beam. The reaction device is symbolised here by a flip-flop which interrupts the current for the light-emitting diode 120 connected downstream.

When a signal is present at the input of the monitoring apparatus, therefore, a window of a predetermined duration is opened. If the signal increases only "permissibly weakly" within that period, it is a case of normal extraction and no measure is applied to the particle beam—the time window is closed again, while the signal falls below the threshold value threshold_LO. If, on the other hand, the signal increases more than is permissible within the period specified by the time window—that is to say increases to or above the value threshold_HI —, it is to be assumed that the signal to be monitored is assuming an undesired curve, which, in the case of particle radiation, means a fast extraction. In that case, an immediate reaction is initiated, here the interruption of the output signal "LIGHT" by the flip-flop 110. It is not necessary, therefore, to measure the actual peak value of the signal; rather, it suffices to detect the rising of the signal at the beginning of the fast extraction. Accordingly, it also suffices if the amplifier 100 at the input can be operated to such a level that it is just still able to amplify the maximum permissible signal rise within the specified time period (that is to say to the value threshold_HI) before it reaches its saturation limit. This on the one hand simplifies the dimensioning of the amplifier with regard to the gain factor and the saturation range and, on the other hand, makes it possible to adjust those two parameters with a view to an as accurate as possible intensity measurement of the normal extraction.

FIG. 3 illustrates the relationships at such an amplifier. Curve 1 in each case represents the input signal, curve 2 the output signal over time. In diagram (a), the amplifier operates linearly for the entire input signal—corresponding to the case of normal extraction —, whereas the amplifier in diagram (b) is overloaded 100 fold; the output signal already reaches the saturation limit shortly after rising. This corresponds to the case of fast extraction. The saturation limit would therefore correspond approximately to the threshold value threshold_HI.

The apparatus according to the first illustrative embodiment (FIGS. 1 and 2) is tailored to the monitoring of signals that fall completely to zero again (or below threshold_LO) between two peak values. If, however, a signal is to be monitored in which a peak value can follow a previous peak value in such a short interval of time that the signal does not fall to zero, the time window generator would not be triggered and a fresh rise measurement would not take place.

For that case the monitoring apparatus is supplemented, as the second illustrative embodiment according to FIGS. 5 and 6 shows, by an edge detector 50, 60 to which the signal to be monitored is likewise supplied after the input amplifier 100. The edge detector consists of a differentiating element 50 and a comparator 60 connected downstream. The differentiating element forms the derivative of the signal PULSE according to time. That time derivative is compared in the comparator 60 with a threshold value threshold_FL. The comparator emits high-level single pulses (logic "1") when the time derivative is greater than the threshold value. The output of the edge detector 50, 60 is AND-ed by the AND gate 70 with the output of the signal detector 10. The output of that AND gate 70 is connected to the time window generator 30 and therefore triggers it. The configuration of the apparatus otherwise corresponds to that described in connection with FIGS. 1 to 3.

FIG. 8 is an illustration of a real signal produced by experimentally forced fast extraction. What is remarkable is the considerably shorter rise time in comparison with the signal in FIG. 4(*b*), and the flat roof of a signal owing to overloading of the amplifier. The principle of the apparatus is based on the fact that the amplifier perceives the signals that are far too high for its setting as if their rise time is considerably shorter than the actual values.

FIG. 7 shows, in the upper diagram, signal levels of particular components of the circuit shown in FIG. 5 for a signal to be monitored according to the lower diagram. In the case of a rising signal (rise greater than or equal to threshold_FL) the output of the edge detector 50, 60 out_fl assumes a high level. If the signal exceeds the threshold value threshold_LO, then the output out_lo of signal detector 10 assumes a high level. The time window signal generator 30 is then triggered by way of the AND gate 70, the output dt of which time window generator emits a high level of a specific duration. During that time, the signal to be monitored also exceeds the upper threshold value threshold_HI, so that the flip-flop is triggered by way of the AND gate 40 and sets the level LIGHT low.

After a predetermined time, the level LIGHT is set high again by the signal clrff. The second peak in the signal to be monitored does not reach the critical threshold value threshold_HI within the time window dt, so that, within that period, there is no reaction by the flip-flop 110. Before the signal rises again to the third peak, it does not fall below the threshold value threshold_LO; the information on the rise of the signal is passed on here in the change of the output of the edge detector. The subsequent procedure corresponds to that in the case of the first peak.

The apparatus according to the invention can also be implemented, of course, with inverse logic.

The apparatus according to the invention and the method according to the invention are not limited to the described use in an irradiation device. Rather, they can be used wherever it is necessary to monitor events that are represented as suddenly occurring peak values in a signal.

What is claimed is:

1. An apparatus for monitoring a signal that exhibits sudden, grossly excessive peak values related to an instantaneous fast extraction particle beam pulse of a synchrotron, comprising:
   a first detector (10) to which the signal is supplied at an input side and which, when the signal exceeds a predetermined first threshold value, emits a trigger signal at an output side;
   a second detector (20) to which the signal is also supplied at an input side and which, when the signal exceeds a predetermined second threshold value, emits an exceed signal at an output side;
   a signal generator (30) to which the output of the first detector (10) is supplied at an input side and which starts to emit a window signal of a predetermined duration as soon as the trigger signal appears at an input side; and
   an AND gate (40) to which the output of the second detector (20) and the output of the signal generator (30) are supplied at an input side and which generates a peak-detection signal at an output side when the window signal and the exceed signal are present at its input side.

2. An apparatus for monitoring a signal, comprising:
   a first detector(10) to which the signal is supplied at its input side and which, when the signal exceeds the predetermined first threshold value, emits a first exceed signal at its output side,
   a second detector (20) to which the signal is also supplied at its input side and which, when the signal exceeds the predetermined second threshold value, emits a second exceed signl at its output side,
   a differentiator (50) to which the signal is also supplied at its input side and which emits the time derivative of the signal at its output side,
   a third detector (60) to which the time-derived signal is supplied at its input side and which, when the signal exceeds a predetermined third threshold value, emits a rise signal at its output side,
   a first AND gate (70) to which the output of the first detector (10) and the output of the third detector (60) are supplied at its input side and which emits a trigger signal at its output side when the first exceed signal and the rise signal are present at its input side,
   a signal generator (30) to which the output of the AND gate (70) is supplied at its input side and which begins to emit a window signal of a predetermined duration at its output side as soon as the trigger signal is present at its input side,
   a second AND gate (40) to which the output of the second detector (2) and the output of the signal generator (30) are supplied at its input side and which generates a peak-detection signal at its output side when the second exceed signal and the window signal are present at its input side.

3. An apparatus according to claim 1, wherein the detectors are each constructed as comparators.

4. An apparatus according to claim 1, comprising an amplifier (100) for amplifying the signal at the input.

5. An apparatus according to claim 1, wherein the signals emitted by each of the detectors are voltage levels.

6. A method for monitoring a signal, which comprises performing the following steps cyclically:
   ascertaining whether the signal exceeds a predetermined first threshold value and, if the signal exceeds the predetermined first threshold value, starting to generate a window signal of high level within a predetermined duration,
   ascertaining whether the signal exceeds a predetermined second threshold value within the duration time defined by the window signal and, if the signal exceeds the predetermined second threshold value within the defined duration, generating an exceed signal, emitting a peak-detection signal, if both the window signal and the exceed signal are present,
   wherein said method utilizes a first AND gate (70) for triggering the generation of the window signal, and a second AND gate (40) for generating the exceed signal.

7. A method for monitoring a signal, which comprises performing the following steps cyclically;
   ascertaining whether the signal exceeds a predetermined first threshold value,
   differentiating the signal according to time;
   if the signal exceeds the predetermined first threshold value and the differentiated signal exceeds a predetermined third threshold value starting to generate a window signal of a predetermined duration,
   ascertaining whether the signal exceeds a predetermined second threshold value and, if the signal exceeds the predetermined value, generating an exceed signal emitting a peak-duration signal if both the window signal and the exceed signal are present.

8. A method for monitoring a signal that exhibits sudden, grossly excessive peak values related to an instantaneous fast extraction particle beam pulse of a synchrotron, comprising the steps of:

supplying the signal to a first detector (10) at an input side, wherein when said signal exceeds a predetermined first threshold value, said first detector (10) emits a trigger signal at an output side;

supplying said signal to a second detector (20) at an input side, wherein when said signal exceeds a predetermined second threshold value, said second detector (20) emits an exceed signal at an output side;

supplying the output of said first detector (10) to a signal generator (30) at an input side, wherein said signal generator (30) starts to emit a window signal of a predetermined duration as soon as the trigger signal appears at an input side; and supplying the output of said second detector (20) and the output of said signal generator (30) to an AND gate (40) at an input side, wherein said AND gate (40) generates a peak-detection signal at an output side when the window signal and the exceed signal are present at its input side.

* * * * *

UNITED STATES PATENT AND TRADEMARK OFFICE
CERTIFICATE OF CORRECTION

PATENT NO. : 6,897,644 B1
DATED : May 24, 2005
INVENTOR(S) : Eugen Badura

It is certified that error appears in the above-identified patent and that said Letters Patent is hereby corrected as shown below:

<u>Title page,</u>
Item [86], PCT No., should be changed from "[86] PCT/EP98/06715" to
-- [86] PCT/EP99/06715 --

Signed and Sealed this

Twelfth Day of July, 2005

JON W. DUDAS
*Director of the United States Patent and Trademark Office*